(12) United States Patent
Nakil et al.

(10) Patent No.: US 9,374,270 B2
(45) Date of Patent: Jun. 21, 2016

(54) MULTICAST SERVICE IN VIRTUAL NETWORKS

(71) Applicant: Juniper Networks, Inc., Sunnyvale, CA (US)

(72) Inventors: Harshad Bhaskar Nakil, San Jose, CA (US); Pedro R. Marques, Sunnyvale, CA (US); Hampapur Ajay, Sunnyvale, CA (US); Ashish Ranjan, San Ramon, CA (US); Ankur Singla, Belmont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 212 days.

(21) Appl. No.: 13/843,365

(22) Filed: Mar. 15, 2013

(65) Prior Publication Data

US 2013/0329605 A1    Dec. 12, 2013

Related U.S. Application Data

(60) Provisional application No. 61/723,685, filed on Nov. 7, 2012, provisional application No. 61/722,696, filed on Nov. 5, 2012, provisional application No. 61/721,979, filed on Nov. 2, 2012, provisional (Continued)

(51) Int. Cl.
*H04L 12/28* (2006.01)
*H04L 12/24* (2006.01)
*H04L 12/931* (2013.01)
*H04L 12/751* (2013.01)

(Continued)

(52) U.S. Cl.
CPC ........ *H04L 41/0668* (2013.01); *H04L 41/0659* (2013.01); *H04L 41/12* (2013.01); *H04L 45/02* (2013.01); *H04L 45/28* (2013.01); *H04L 49/70* (2013.01); *H04L 67/32* (2013.01)

(58) Field of Classification Search
USPC .......... 370/390, 256, 389, 392, 432; 709/238, 709/227
See application file for complete search history.

(56) References Cited

U.S. PATENT DOCUMENTS 6,760,328 B1    7/2004 Ofek
6,778,531 B1 *  8/2004 Kodialam et al. ............. 370/390

(Continued)

OTHER PUBLICATIONS

Invitation to Pay Additional Fees from International Application No. PCT/US2013/044378, dated Sep. 18, 2013, 5 pp.

(Continued)

*Primary Examiner* — Phuongchau Ba Nguyen
(74) *Attorney, Agent, or Firm* — Shumaker & Sieffert, P.A.

(57) ABSTRACT

Techniques are described to provide multicast service within a virtual network using a virtual network controller and endpoint replication without requiring multicast support in the underlying network. The virtual network controller is configured to create a multicast tree for endpoint devices of a multicast group in the virtual network at a centralized location instead of in a distributed fashion. The virtual network controller communicates the multicast tree to one or more of the endpoint devices of the multicast group to instruct the endpoint devices to replicate and forward multicast packets to other endpoint devices according to the multicast tree. The replication and forwarding of multicast packets is performed by virtual switches executed on the endpoint devices in the virtual network. No replication is performed within the underlying network. The techniques enable multicast service within a virtual network without requiring multicast support in the underlying network.

37 Claims, 10 Drawing Sheets

Related U.S. Application Data application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
*H04L 29/08* (2006.01)
*H04L 12/703* (2013.01)

(56) References Cited

U.S. PATENT DOCUMENTS

| | | | |
|---|---|---|---|
| 7,042,838 | B1 | 5/2006 | Shand et al. |
| 7,184,437 | B1 | 2/2007 | Cole et al. |
| 7,519,006 | B1 | 4/2009 | Wing |
| 7,519,010 | B1 * | 4/2009 | Aggarwal et al. ............ 370/254 |
| 7,937,492 | B1 | 5/2011 | Kompella et al. |
| 8,289,978 | B2 * | 10/2012 | Chase ............................. 370/400 |
| 8,339,996 | B2 * | 12/2012 | Wijnands et al. ............. 370/256 |
| 8,713,627 | B2 * | 4/2014 | Varadhan et al. ................. 726/1 |
| 8,908,686 | B1 * | 12/2014 | Ghosh ............................ 370/390 |
| 2005/0007969 | A1 * | 1/2005 | Hundscheidt et al. ........ 370/312 |
| 2005/0015511 | A1 * | 1/2005 | Izmailov et al. ............... 709/238 |
| 2005/0108356 | A1 * | 5/2005 | Rosu et al. ..................... 709/214 |
| 2007/0195797 | A1 | 8/2007 | Patel et al. |
| 2008/0049763 | A1 * | 2/2008 | Damm ................ H04L 12/4625 370/400 |
| 2010/0046400 | A1 * | 2/2010 | Wu et al. ........................ 370/256 |
| 2010/0061242 | A1 | 3/2010 | Sindhu et al. |
| 2011/0044336 | A1 * | 2/2011 | Umeshima .................... 370/390 |
| 2011/0103259 | A1 | 5/2011 | Aybay et al. |
| 2011/0299531 | A1 * | 12/2011 | Yu et al. ......................... 370/392 |
| 2012/0110186 | A1 | 5/2012 | Kapur et al. |
| 2012/0170578 | A1 * | 7/2012 | Anumala et al. .............. 370/390 |
| 2013/0003733 | A1 * | 1/2013 | Venkatesan et al. .......... 370/390 |

OTHER PUBLICATIONS

Notification of Transmittal of the International Search Report from International Application No. PCT/US2013/044378, dated Nov. 7, 2013, 16 pp.

* cited by examiner

MULTICAST SERVICE IN VIRTUAL NETWORKS

PRIORITY CLAIM

This application claims the benefit of U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012, the entire content of each of which being incorporated herein by reference.

TECHNICAL FIELD

Techniques of this disclosure relate generally to computer networks, and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers, e.g., a Clos network. More sophisticated data centers provide infrastructure spread throughout the world with subscriber support equipment located in various physical hosting facilities.

In general, multicast service involves delivering data through a network to a group of subscribers, e.g., customers of a data center or servers within a data center, substantially simultaneously in a single transmission from a source device, e.g., a server. As an example, when two or more subscribers are interested in receiving the same multicast data, each of the subscribers may request to join a multicast group associated with the multicast data. The multicast data from the source is replicated, as needed, by physical network switches and routers within the network in order to reach the subscribers of the multicast group. The network switches and routers used to replicate and forward the multicast data for the multicast group may create a multicast distribution tree through the network for delivery of the multicast data.

In a case where a large number of servers are interconnected by a switch fabric, each pair of servers may have a large number of equal cost paths between them. In this scenario, layer two (L2) connectivity between the physical servers may become unmanageable, and the physical servers may only be connected to each other using layer three (L3) connectivity. The physical servers connected via the switch fabric may communicate using unicast service, but multicast service between the physical servers may be more difficult to manage due to the large number of redundant paths in the network. In some cases, a virtual overlay network may be built on top of the switch fabric to emulate an L2 network between virtual switches executed on the servers using a tunnel encapsulation protocol, e.g., IP-in-IP, NvGRE, or VXLAN. In order for the virtual overlay network to emulate L2 multicast service, however, the underlying switch fabric must also support multicast service.

SUMMARY

In general, techniques are described to provide multicast service within a virtual network without requiring multicast support in the underlying network. More specifically, the techniques enable support of L2 multicast service in a virtual overlay network of a switch fabric using a logically centralized virtual network controller and endpoint replication. The virtual network controller is configured to create a multicast tree for endpoint devices, e.g., servers, of a multicast group in the virtual network. The virtual network controller then communicates the multicast tree to one or more of the endpoint devices of the multicast group to instruct the endpoint devices to replicate and forward multicast packets to other endpoint devices according to the multicast tree. The multicast tree may be a unidirectional multicast tree or a bidirectional multicast tree.

According to the techniques, the multicast tree is calculated at a centralized location of the virtual network controller instead of in a distributed fashion by network switches and routers that service the multicast group. In addition, the replication and forwarding of multicast packets is performed by virtual switches executed on the endpoint devices in the virtual network. No replication is performed within the underlying network. In this way, the techniques enable multicast service within a virtual network without requiring multicast support in the underlying network. In addition, the centralized virtual network controller may create the multicast tree to minimize a replication limit such that several endpoints of the virtual network may replicate and forward a small number of multicast packets, instead of the source endpoint having to incur the load of replicating and forwarding the packets to all the endpoints that belong to the multicast group. Further, the virtual network controller may configure a unique virtual network tunnel encapsulation for each link direction in the multicast tree for the multicast group in order to efficiently use bandwidth in the network.

In one example, a method comprises creating, with a virtual network controller of a virtual network, a multicast tree for endpoint devices of a multicast group in the virtual network, storing the multicast tree in a memory within the virtual network controller, and communicating, with the virtual network controller, the multicast tree to one or more of the endpoint devices of the multicast group in order to instruct virtual switches executed on the endpoint devices to replicate and forward multicast packets according to the multicast tree.

In another example, a method comprises receiving, with an endpoint device of a multicast group in a virtual network, multicast packets for the multicast group to be forwarded on the virtual network according to a multicast tree for the multicast group, the multicast tree created by a virtual network controller of the virtual network, replicating, with a virtual switch executed on the endpoint device, the multicast packets for the multicast group according to the multicast tree, and forwarding, with the virtual switch executed on the endpoint device, the replicated multicast packets using tunnel encapsulations to one or more other endpoint devices of the multicast group according to the multicast tree.

In a further example, a virtual network controller of a virtual network comprises a memory, and one or more processor configured to create a multicast tree for endpoint devices of a multicast group in the virtual network, store the multicast tree in the memory of the virtual network controller, and communicate the multicast tree to one or more of the endpoint devices of the multicast group in order to instruct virtual switches executed on the endpoint devices to replicate and forward multicast packets according to the multicast tree.

In an additional example, an endpoint device in a virtual network comprises one or more processors configured to receive multicast packets for a multicast group to which the endpoint device belongs to be forwarded on the virtual network according to a multicast tree for the multicast group, wherein the multicast tree is created by a virtual network controller of the virtual network, and a virtual switch executed on the processors configured to replicate the multicast packets for the multicast group according to the multicast tree, and forward the replicated multicast packets using tunnel encapsulations to one or more other endpoint devices of the multicast group according to the multicast tree.

In another example, a system of a virtual network, the system comprises a virtual network controller configured to create a multicast tree for endpoint devices of a multicast group in the virtual network, store the multicast tree in a memory within the virtual network controller, and communicate the multicast tree to one or more of the endpoint devices of the multicast group, and one of the endpoint devices of the multicast group configured to receive multicast packets for the multicast group to be forwarded on the virtual network, and execute a virtual switch to replicate multicast packets for the multicast group according to the multicast tree, and forward the replicated multicast packets using tunnel encapsulations to one or more of the other endpoint devices of the multicast group according to the multicast tree.

In a further example, a computer-readable storage medium comprises instructions that when executed cause one or more processor to create, with a virtual network controller of a virtual network, a multicast tree for endpoint devices of a multicast group in the virtual network, store the multicast tree in a memory within the virtual network controller, and communicate, with the virtual network controller, the multicast tree to one or more of the endpoint devices of the multicast group in order to instruct virtual switches executed on the endpoint devices to replicate and forward multicast packets according to the multicast tree.

In another example, a computer-readable storage medium comprises instructions that when executed cause one or more processor to receive, with an endpoint device of a multicast group in a virtual network, multicast packets for the multicast group to be forwarded on the virtual network according to a multicast tree for the multicast group, the multicast tree created by a virtual network controller of the virtual network, replicate, with a virtual switch executed on the endpoint device, the multicast packets for the multicast group according to the multicast tree, and forward, with the virtual switch executed on the endpoint device, the replicated multicast packets using tunnel encapsulations to one or more other endpoint devices of the multicast group according to the multicast tree.

DETAILED DESCRIPTION

Figure 1:
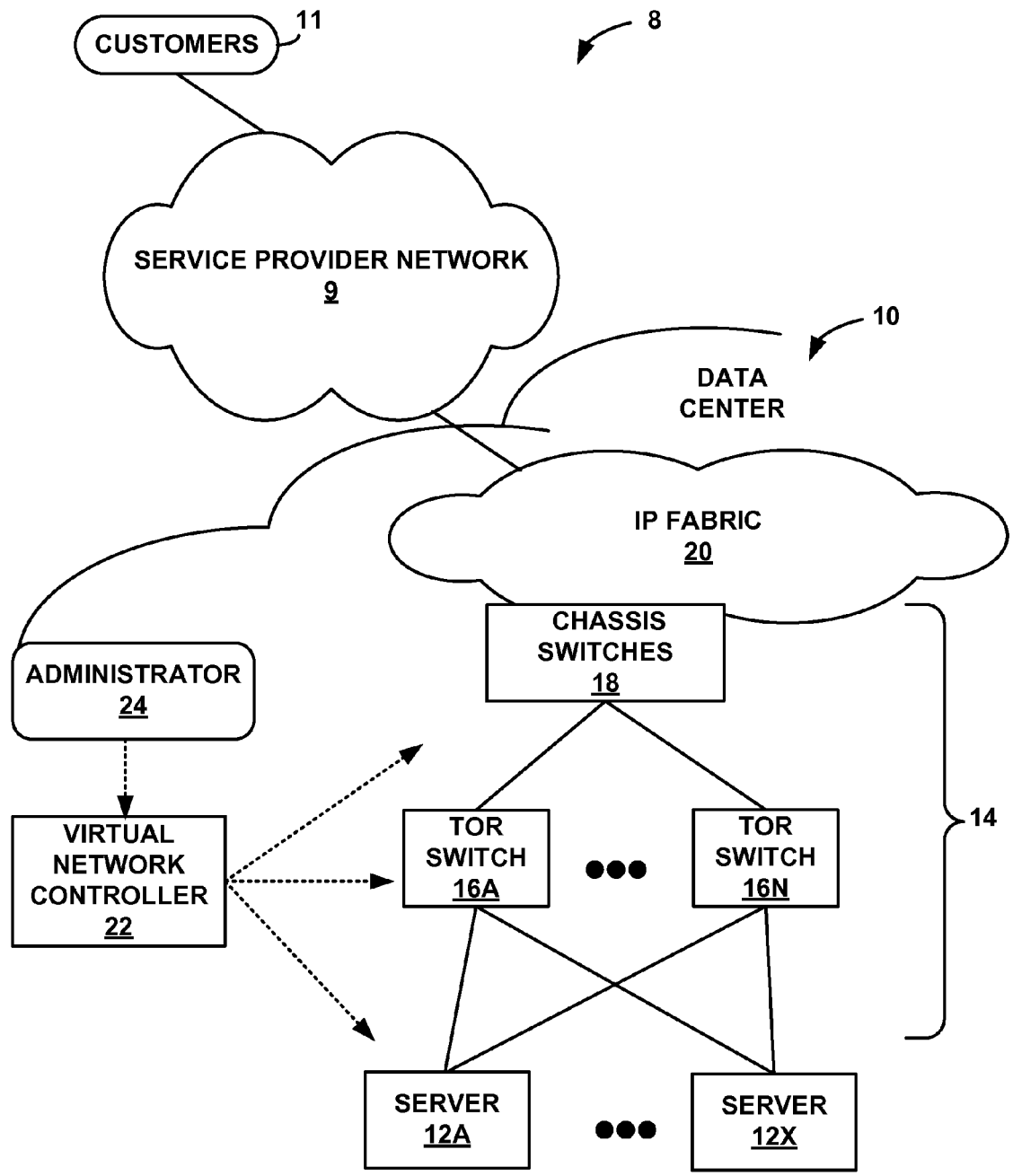
FIG. 1 is a block diagram illustrating an example network having a data center configured to implement one or more of the techniques described in this disclosure.

FIG. 1 is a block diagram illustrating an example network 8 having a data center 10 configured to implement one or more of the techniques described in this disclosure. In general, data center 10 provides an operating environment for applications and services for customers 11 coupled to data center 10 by service provider network 9. Data center 10 may, for example, host infrastructure equipment, such as networking and storage systems, redundant power supplies, and environmental controls. Service provider network 9 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers, e.g., a Clos network. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 9. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 9.

Virtual network controller ("VNC") 22 provides a logically centralized controller for facilitating operation of one or more virtual networks within data center 10 in accordance with one or more examples of this disclosure. In some examples, virtual network controller 22 may operate in response to configuration input received from a network administrator 24. As described in further detail below, servers 12 may include one or more virtual switches that create and manage one or more virtual networks as virtual overlay networks of switch fabric 14.

In a case where a large number of servers 12, e.g., 2000 servers, are interconnected by switch fabric 14, each pair of servers may have a large number of equal cost paths between them. In this scenario, layer two (L2) connectivity between physical servers 12 may become unmanageable, and physical servers 12 may only be connected to each other using layer three (L3) connectivity. In the case where servers 12 include virtual switches managed by VNC 22, however, a virtual overlay network may be built on top of switch fabric 14 to emulate an L2 network between the virtual switches executed on servers 12 using a tunnel encapsulation protocol, e.g., IP-in-IP, NvGRE, or VXLAN.

In order to provide network services for customers 11, servers 12 of data center 10 exchange large amounts of data with each other via switch fabric 14. In general, it may be desirable for servers 12 to communicate using multicast service. Multicast service involves delivering data through a network to a group of subscribers substantially simultaneously in a single transmission from a source device. In the example of FIG. 1, when two or more of servers 12 are interested in receiving the same multicast data from a source server 12A, for example, the interested servers 12 may request to join a multicast group associated with the multicast data.

In a conventional data center, in order to forward the multicast data from a source server to two or more other servers, the multicast data is replicated, as needed, by the physical network switches and routers within the switch fabric. The network switches and routers used to replicate and forward the multicast data for the multicast group may create a multicast distribution tree through the switch fabric to manage the replication and delivery of the multicast data. In a case where a large number of servers, e.g., 2000 servers, are interconnected by the switch fabric, each pair of servers may have a large number of equal cost paths between them. The physical servers may communicate using unicast service, but multicast service between the physical servers may be more difficult to manage due to the large number of redundant paths in the switch fabric.

In addition, multicast protocols used in the conventional data center may waste bandwidth by not efficiently using all of the available links within the switch fabric. Moreover, the physical switches and routers within the switch fabric may only be able to support a very small number of multicast tables such that the conventional data center will be unable to scale to support the large number of multicast groups necessary for the large number of interconnected servers.

The above issues with providing L3 multicast service between servers in a large data center may not be solved, however, with a virtual overlay network built on the switch fabric to emulate an L2 network between virtual switches executed on the servers. Conventionally, in order for the virtual overlay network to emulate L2 multicast service, the underlying switch fabric must also support multicast service.

In general, this disclosure describes techniques to provide multicast service within a virtual network without requiring multicast support in the underlying network. More specifically, the techniques enable support of L2 multicast service in a virtual overlay network of switch fabric 14 using virtual network controller 22 and endpoint replication. The virtual network controller 22 is configured to create a multicast tree for endpoint devices, e.g., servers 12, of a multicast group in the virtual network. The multicast tree is considered a multicast tree because it is created in a virtual overlay network emulating L2 multicast such that any of servers 12 can be the source server of the multicast traffic, known as bidirectional multicast. The virtual network controller 22 then communicates the multicast tree to one or more of servers 12 of the multicast group to instruct servers 12 to replicate and forward multicast packets to the two or more of servers 12 that belong to the multicast group according to the multicast tree.

According to the techniques, the multicast tree is calculated at virtual network controller 22 instead of in a distributed fashion by network switches and routers in switch fabric 14 that service the multicast group. In addition, the replication and forwarding of multicast packets is performed by virtual switches executed on servers 12 of the virtual network. No replication is performed within the underlying switch fabric 14. In this way, the techniques enable multicast service within a virtual network without requiring multicast support in the underlying network. For example, switch fabric 14 does not need to support L3 multicast, which may make switch fabric 14 simple and easy to mange.

In addition, virtual network controller 22 may create the multicast tree to minimize a replication limit such that several of servers 12 may replicate and forward a small number of multicast packets, instead of a single source server having to incur the load of replicating and forwarding the packets to all the servers that belong to the multicast group. Further, virtual network controller 22 may configure a unique virtual network tunnel encapsulation for each link direction in the multicast tree for the multicast group in order to efficiently use bandwidth in switch fabric 14. The techniques are described in more detail with respect to virtual network controller 22 and servers 12 in FIG. 2.

Figure 2:
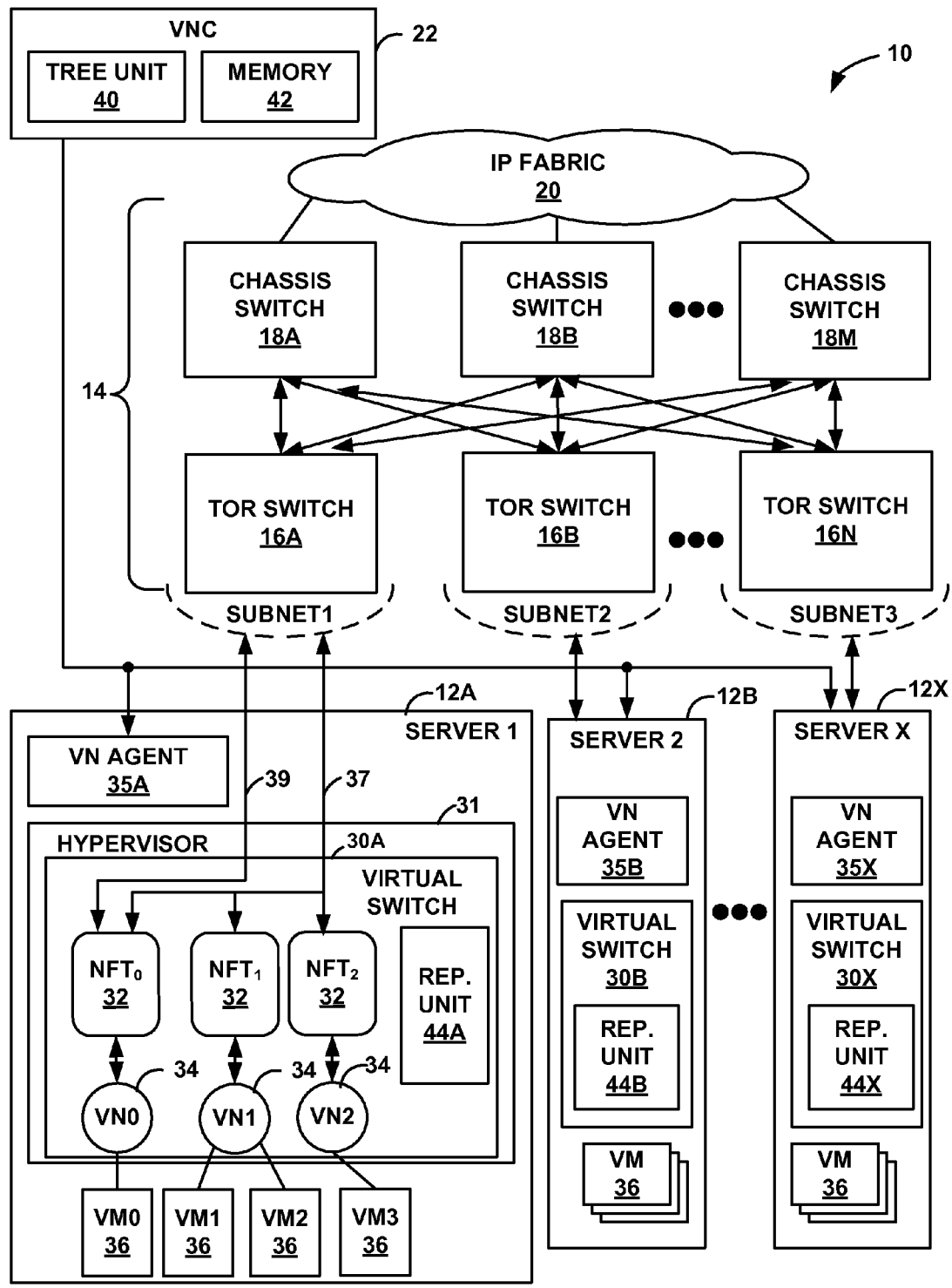
FIG. 2 is a block diagram illustrating, in further detail, an example data center configured to implement one or more of the techniques described in this disclosure.

FIG. 2 is a block diagram illustrating, in further detail, an example of data center 10 of FIG. 1 configured to implement one or more of the techniques described in this disclosure. In the example of FIG. 2, data center 10 includes a virtual overlay network that extends switch fabric 14 from physical switches 16, 18 to software switches 30A-30X (also referred to as a "virtual switches 30"). Virtual switches 30 dynamically create and manage one or more virtual networks (VNs) 34 to be used by applications communicating with application instances. In one example, virtual switches 30 execute a virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. Various techniques may be used to transport packets within and across virtual networks 34 over the physical network. For example, the techniques described in this disclosure provide multicast service within virtual networks 34 without requiring multicast support in the underlying physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent 35A-35×("VN agents 35") that controls the overlay of virtual networks 34 and that coordinates the routing of data packets within server 12. In general, each of VN agents 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP-in-IP, IP over GRE, VxLAN, NvGRE, MPLS over GRE, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as the overlay network of data center 10. Switches 16, 18 and virtual switches 30 also maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packets to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14. Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network.

The techniques described in this disclosure provide multicast service within the virtual overlay network without requiring multicast support in the underlying physical network. In accordance with the techniques, virtual network controller 22 includes a tree unit 40 configured to create or calculate a multicast tree for one or more of servers 12 that belong to a given multicast group in the virtual network 34. In general, tree unit 40 may create a different multicast tree for each multicast group within each of virtual networks 34. Tree unit 40 may create the multicast trees to facilitate delivery of multicast packets for the multicast groups between two or more servers in the virtual networks 34. Tree unit 40 then stores the different multicast trees in a memory 42 within virtual network controller 22.

In some cases, the multicast trees may be unidirectional multicast trees in which a root node of the multicast tree operates as the source of the multicast packets for the multicast group and the multicast packets are communicated in a single, downstream direction from the root node. In other cases, the multicast trees may be bidirectional multicast trees in which any node of the multicast tree may operate as the source of the multicast packets for the multicast group and the multicast packets may be communicated in either an upstream or downstream direction from a root node of the multicast tree. According to the techniques, virtual network controller 22 may create bidirectional multicast trees because virtual network 34 emulates L2 multicast, which supports bidirectional multicast.

According to the techniques, the multicast trees are calculated at the centralized location of virtual network controller 22 instead of in a distributed fashion by TOR switches 16 and chassis switches 18 that service the multicast group in the underlying physical network. In this way, the location of servers 12 connected to the underlying network may be considered. For example, in a data center, it may be desirable for tree unit 40 to create a multicast tree such that replication by servers within a given physical rack does not cross rack boundaries.

In the context of multicasting in virtual networks 34, VMs 36 executed in servers 12 may exchange messages to learn about "neighboring" multicast-enabled VMs 36 in other servers 12. In the contest of virtual networks 34, servers 12 may be considered logical neighbors that are directly reachable by tunneling over the underlying physical network. In one example, servers 12 may exchange Protocol Independent Multicast (PIM) messages in virtual networks 34. As described above, the underlying physical network may not support multicast service such that the multicast neighbor messages may be communicated between servers 12 and virtual network controller 22 using virtual networks 34.

In order to create the multicast trees, virtual network controller 22 may receive join requests from one or more of servers 12 interested in receiving multicast packets associated with a particular multicast group. Virtual network controller 22 may similarly receive leave requests from servers 12 that would like to stop receiving multicast packets for the multicast group. For example, virtual network controller 22 may receive the join or leave requests as packets that conform to Internet Group Management Protocol (IGMP) or another multicast protocol. The join and leave request packets may include a multicast group identifier, and a virtual address of a VM 36 executed on one of servers 12 that is interested in joining or leaving the identified multicast group. As described above, the underlying network may not support multicast service such that join and leave requests for the multicast groups may be communicated between servers 12 and virtual network controller 22 using virtual networks 34. Virtual network controller 22 may maintain membership information mapping VMs 36 to multicast groups for each virtual network 34.

Tree unit 40 of virtual network controller 22 may then create a multicast tree of a given multicast group based on the membership information and the routing information maintained for the physical network and the associated virtual network 34. For example, tree unit 40 may determine a topology of the multicast tree based on the servers 12 that include VMs 36 that belong to the multicast group, the available paths in the physical network between the servers 12 included in the multicast group, and the tunnels between the servers 12 in the virtual network 34.

In addition, tree unit 40 may determine a topology of the multicast tree based on a replication limit for each of servers 12 included in the multicast group of the multicast tree. In some cases, tree unit 40 may calculate the multicast tree in order to minimize a replication limit for each of the servers and balance the replication across the tree. In this way, tree unit 40 may create the multicast tree such that each of the servers 12 performs a similar, small amount of replication, instead of one or two servers having to incur the load of replicating and forwarding the packets to all the servers that belong to the multicast group.

As an example, tree unit 40 may create a multicast tree to minimize the replication limit such that each of servers 12 sends at most a quantity (N) of packet copies. The replication limit may be selected to be greater than or equal to 2 and substantially less than the quantity (M) of servers in the multicast group, i.e., $2 \leq N \ll M$. In another example, the replication limit may be selected to be less than or equal to the quantity of the devices minus one, i.e., $2 \leq N \leq M-1$. In yet another example, the replication limit for each of servers 12 may be configured to be fixed at certain value, e.g., 8 or 16.

In some cases, tree unit 40 may be configured to determine the replication limit (N) at least based on the number of servers (M) in the multicast group and latency requirements, which are proportional to a number of replication stages or levels (i.e., depth of the multicast tree). In this case, the replication limit may be determined based on balancing two factors: minimizing the tree depth (D) of the multicast tree and minimizing the replication limit (N) for each of the servers in the multicast tree. Tree unit 40 may be configurable to give greater weight to either tree depth or replication limit. For example, the replication limit may be determined in order to satisfy $[\ LOG_N(M)]=D$. In some cases, the number of replications for a given server 12 may be a function of the performance of the replication unit 40 of the server 12. For example, tree unit 40 may maintain a table in memory 42 that gives replication count based on a type of the server 12. If the smallest table entry for a server 12 in the multicast group is equal to K, then $2 \leq N \leq K$ such that if $[\ LOG_K(M)]$ is less than D and $[\ LOG_N(M)]=D$. Several methods for minimizing the replication limit and balancing the replications limit and the tree depth are described in greater detail below with respect to FIGS. 6A-6B and 8.

Virtual network controller 22 may also be configured to generate a unique tunnel encapsulation for each link direction of the generated multicast tree. In the multicast tree, the tunnel encapsulation in each direction is unique because each direction of a link between two of servers 12 has a different combination of source-IP-address (SIP), destination-IP-address (DIP) and multicast group-ID (MGID). This combination in an ordered tuple {SIP,DIP,MGID} will not repeat for any other group or link or other direction of the same link. In this way, servers 12 may use a different tunnel encapsulation header for each packet copy.

In data center 10, the paths between servers 12 through switch fabric 14 may be substantially equally probable such that forwarding may not be limited to certain links chosen by multicast algorithms in the underlying physical network. The different tunnel encapsulation headers allow multiple equal cost paths in the physical network to be used for the same multicast group, which efficiently utilizes bandwidth of the network. A configuration in which each link direction in the multicast tree has a unique tunnel encapsulation header may enable virtual network controller 22 to randomize the distribution of traffic over the multiple equal cost paths in the underlying physical network.

In order to perform multicast in a virtual network 34, virtual network controller 22 communicates a multicast tree created for specific multicast group in the virtual network 34 to servers 12 that belong to the multicast group. In some examples, virtual network controller 22 communicates a multicast tree to one of servers 12 as tree forwarding state including one or more forwarding entries of the multicast tree relevant to the particular one of servers 12. The forwarding entries may be stored in NFT 32 corresponding to the virtual network 34. The tree forwarding state may include next hop information of the multicast tree for virtual switch 30 of the server 12. The next hops may be chained next hop that specify replication to be performed on each multicast packet for the multicast group by virtual switch 30 when forwarding the packet.

The communicated multicast tree instructs virtual switches 30 of the servers 12 to replicate and forward multicast packets to other servers 12 according to the multicast tree. As illustrated in FIG. 2, virtual switches 30 each include a corresponding one of replication units 44A-44X ("rep. units 44"). Replication units 44 replicate a received multicast packet based on the topology of the multicast tree. Virtual switches 30 then forward the packet copies to one or more other servers of the multicast group using tunnel encapsulation in accordance with one of NFTs 32 as configured by virtual network controller 22.

According to the techniques, server 12A, for example, receives a multicast tree for a multicast group in a virtual network 34 to which server 12A belongs from virtual network controller 22. Server 12A may then receive multicast packets for the multicast group to be forwarded on the virtual network according to the multicast tree for the multicast group. Virtual switch 30A of server 12A uses replication unit 44A to replicate the multicast packets for the multicast group according to the received bidirectional multicast. If server 12A is the source server or an intermediate server in the multicast tree, then replication unit 44A may create one or more copies of the packet as required by the multicast tree. According to the multicast tree, replication unit 44A of server 12A may generate no more than N copies of the multicast packet. One or more of servers 12B-12X that belong to the same multicast group may also receive the multicast tree from virtual network controller 22. The replication units 44B-44X of each of the servers 12B-12X may also generate a number of copies of the multicast packet according to the multicast tree. In some cases, the number of copies may be the same as the number of copies generated by replication unit 44A. In other cases, the number of the copies may be different than generated by replication unit 44A.

Virtual switch 30A then forwards the replicated multicast packets using tunnel encapsulation to the other servers 12 of the multicast group in the virtual network according to the multicast tree. Virtual switch 30A may encapsulate each of the copies of the packet in a unique tunnel encapsulation header as specified by one of NFTs 32 in virtual switch 30A, as configured by virtual network controller 22. In this way, multiple equal cost paths in the underlying network may be used for the same multicast group to efficiently use bandwidth. The unique tunnel encapsulation headers may be configured by virtual network controller 22 such that each link direction in the multicast tree has a unique virtual network tunnel encapsulation. The replication and forwarding of multicast packets is only performed by virtual switches 30 executed on servers 12 in the virtual network. No replication is performed within the underlying network. In this way, the techniques enable multicast service within a virtual network without requiring multicast support in the underlying network.

Figure 3:
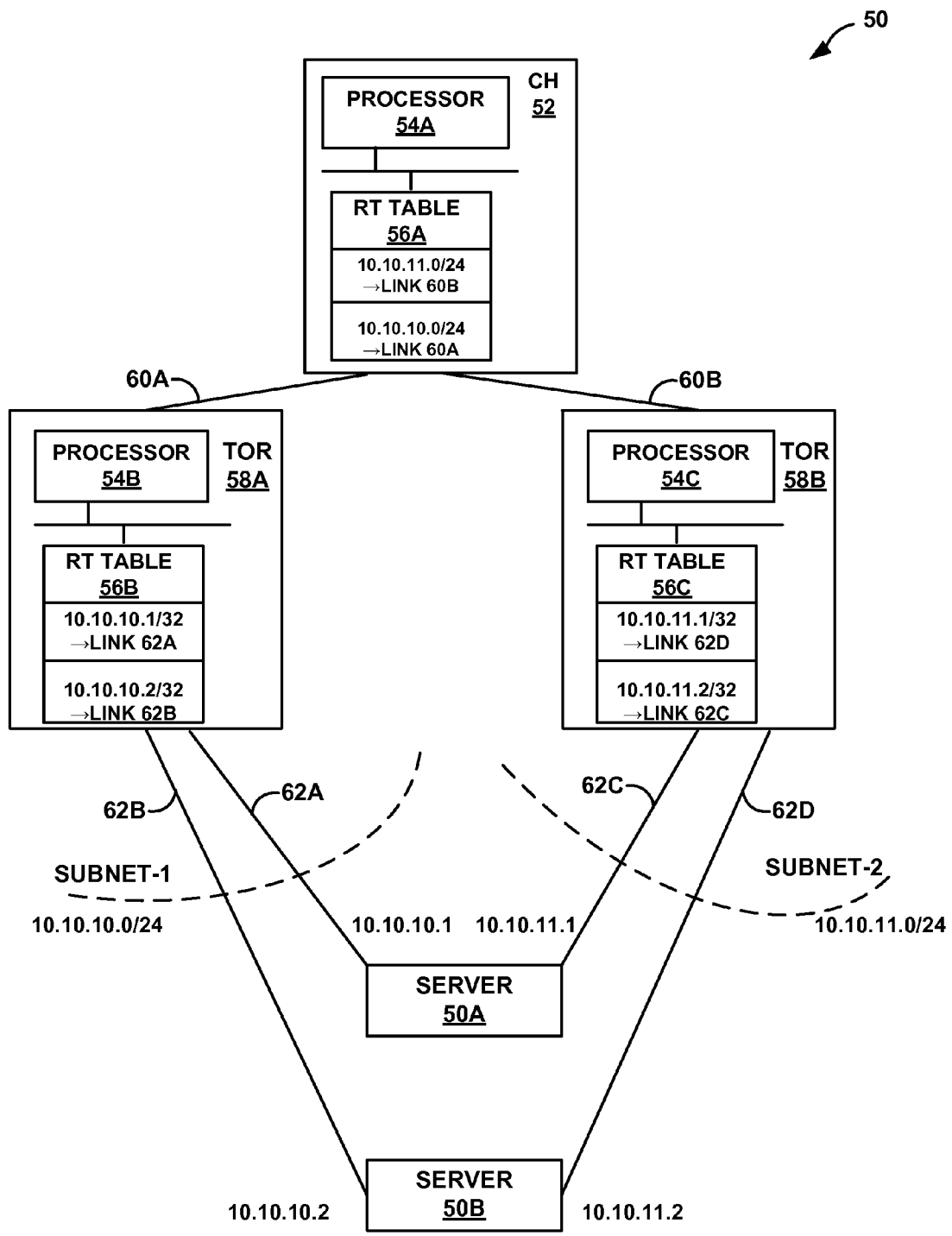
FIG. 3 is a block diagram illustrating an example configuration of chassis switches and top-of-rack (TOR) switches within a data center, in accordance with the techniques of this disclosure.

FIG. 3 is a block diagram illustrating an example configuration of chassis switches and top-of-rack (TOR) switches within a system 50, in accordance with the techniques of this disclosure. System 50 of FIG. 3 may, for example, correspond to portions of data center 10 illustrated in FIGS. 1 and 2.

In this example, chassis switch 52 ("CH 52"), which may be any of chassis switches 18 of FIGS. 1 and 2, is coupled to Top of Rack (TOR) switches 58A-58B ("TORs 58") by chassis link 60A and chassis link 60B, respectively ("chassis links 60"). TORs 58 may, in some examples, be any of TORs 16 of FIGS. 1 and 2. In the example of FIG. 3, TORs 58 are also coupled to servers 50A-50B ("servers 50") by TOR links 62A-62D ("TOR links 62"). Servers 50 may be any of servers 12 of FIGS. 1 and 2. Servers 50 communicate with TORs 58, and may physically reside in either associated rack. TORs 58 each communicate with a number of network switches, including chassis switch 52.

Chassis switch 52 has a processor 54A in communication with an interface for communication with a network, as shown, as well as a bus that connects a memory (not shown) to processor 54A. The memory may store a number of software modules. These modules include software that controls network routing, such as an Open Shortest Path First (OSPF) module (not shown) containing instructions for operating chassis switch 52 in compliance with the OSPF protocol. Chassis switch 52 maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component. TORs 58 each includes a respective processor 54B, 54C, an interface in communication with chassis switch 52, and a memory (not shown). Each memory contains software modules including an OSPF module and routing table 56B, 56C as described above.

TORs 58 and chassis switch 52 may exchange routing information specifying available routes, such as by using a link-state routing protocol such as OSPF or IS-IS. TORs 58 may be configured as owners of different routing subnets. For example, TOR 58A is configured as the owner of Subnet 1, which is the subnet 10.10.10.0/24 in the example of FIG. 2, and TOR 58A is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 52. Instead, in general TORs 58 will only advertise their subnet addresses to chassis switch 52.

Chassis switch 52 maintains RT table 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 52 receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.10.0, i.e., the address of the subnet of TOR 58A, the routing table of chassis switch 52 indicates that the packet is to be sent to TOR 58A via link 60A, and chassis switch 52 transmits the packet accordingly, ultimately for forwarding to a specific one of the servers 50.

Similarly, each of TORs 58 receives IP packets through its network interface, reads the packets' destination IP addresses, looks up these addresses on its routing table 56B, 56C to determine the corresponding destination component, and forwards the packets according to the result of the lookup.

Figure 4:
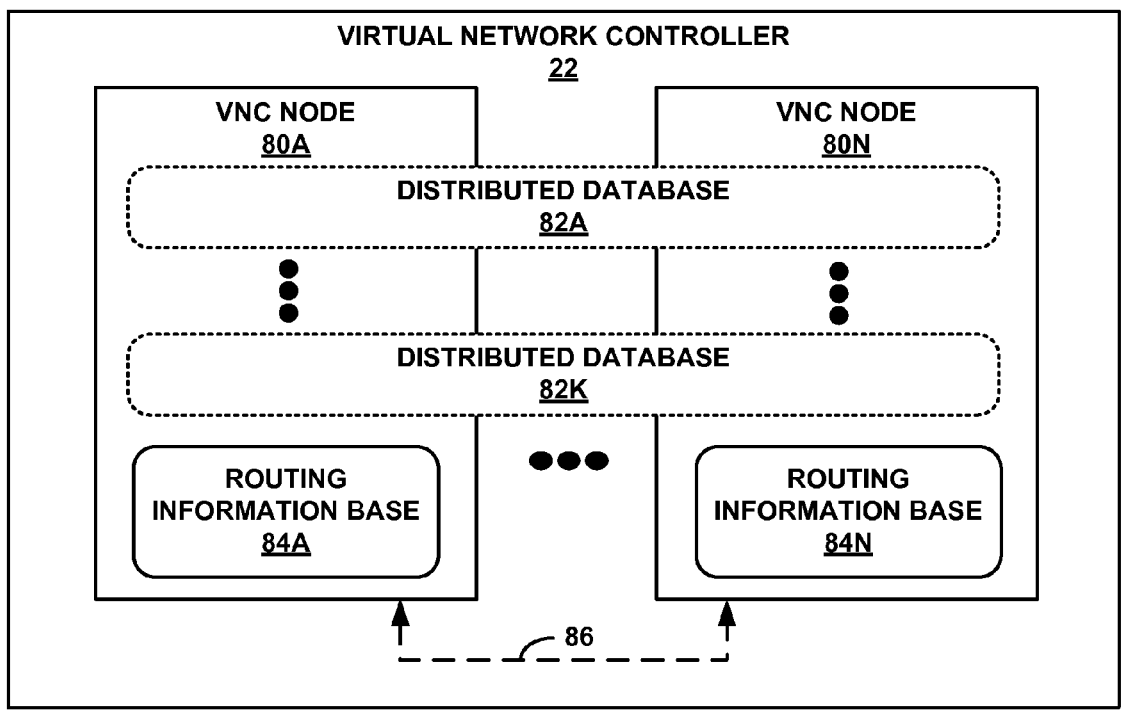
FIG. 4 is a block diagram illustrating an example implementation of a virtual network controller configured to facilitate operation of the data center from FIG. 1, in accordance with the techniques of this disclosure.

FIG. 4 is a block diagram illustrating an example implementation of a virtual network controller 22 configured to facilitate operation of the data center from FIG. 1, in accordance with the techniques of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributed databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22.

Figure 5:
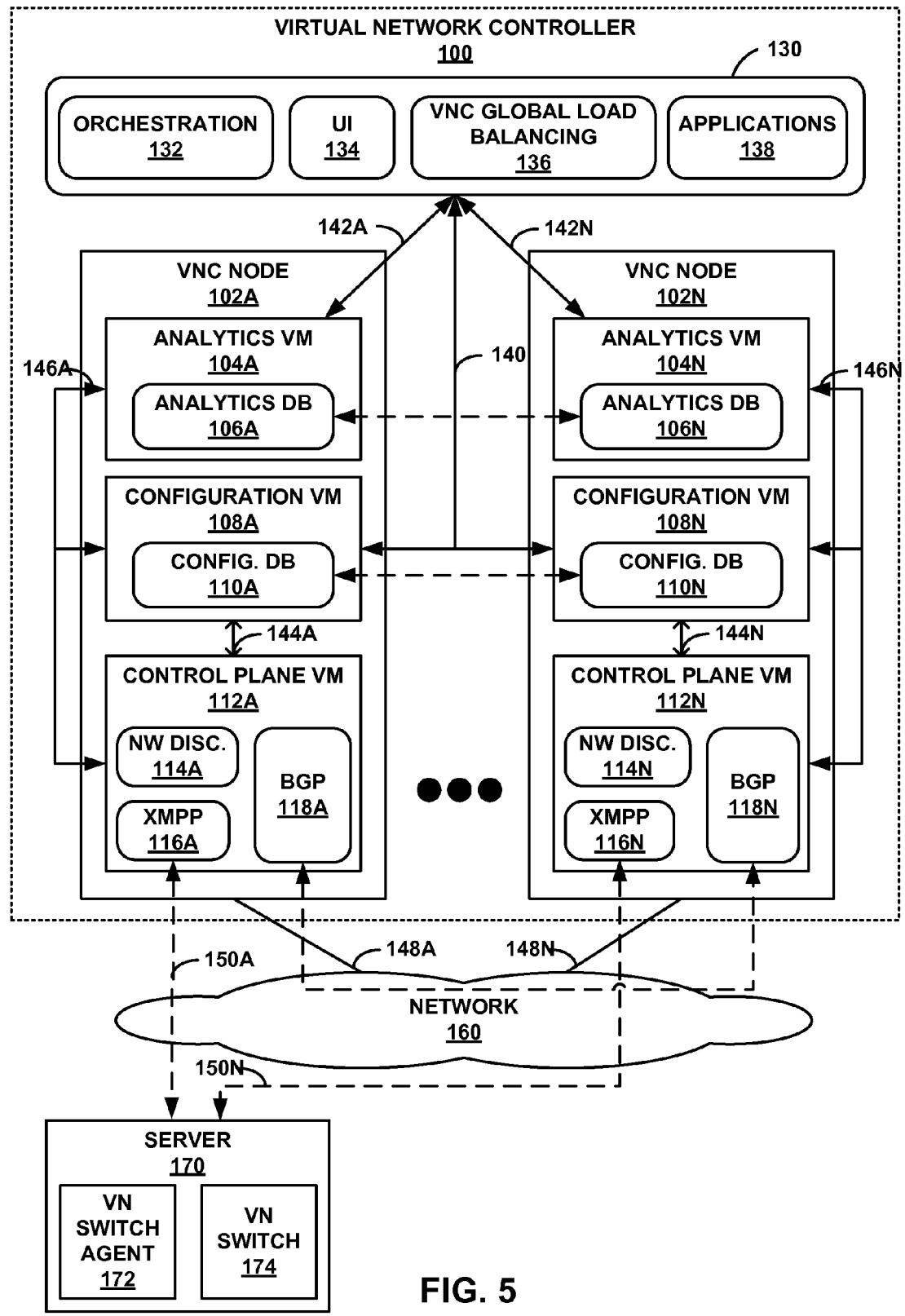
FIG. 5 is a block diagram illustrating an example implementation of a virtual network controller configured to facilitate operation of one or more virtual networks, in accordance with one or more of the techniques described in this disclosure.

FIG. 5 is a block diagram illustrating an example implementation of a virtual network controller 100 configured to facilitate operation of one or more virtual networks, in accordance with one or more of the techniques described in this disclosure. Virtual network controller 100 may, for example, correspond to virtual network controller 22 of data center 10 of FIGS. 1, 2 and 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and other VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106A, and may receive at least some diagnostic information related to any of the elements managed by other VNC nodes 102. Analytics database 106A may represent a distributed hash table (DHT), for instance, or any suitable data structure for storing diagnostic information for network elements in a distributed manner in cooperation with other VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, and may receive at least some configuration information related to any of the elements managed by other VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed via user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network with other control plane instances and/or other third party networking equipment. Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VN switch 174 executed by server 170, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 116A. Virtual network route data, statistics collection, logs, and configuration information may, in accordance with XMPP 116A, be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration VM 108A associated with configuration database 110A. Communication interface 144A may represent an IF-MAP interface.

VNC node 102A may include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics VM 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 of server 170 may implement the layer 3 forwarding and policy enforcement point for one or more endpoints and/or one or more hosts. The one or more endpoints or one and/or one or more hosts may be classified into a virtual network due to configuration from control plane VM 112A. Control plane VM 112A may also distribute virtual-to-physical mapping for each endpoint to all other endpoints as routes. These routes may identify the next hop mapping virtual IP to physical IP and the tunnel encapsulation technique (e.g., one of IPinIP, NVGRE, VXLAN, etc.). Virtual network switch 174 may be agnostic to which actual tunneling encapsulation is used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

Figure 6A:
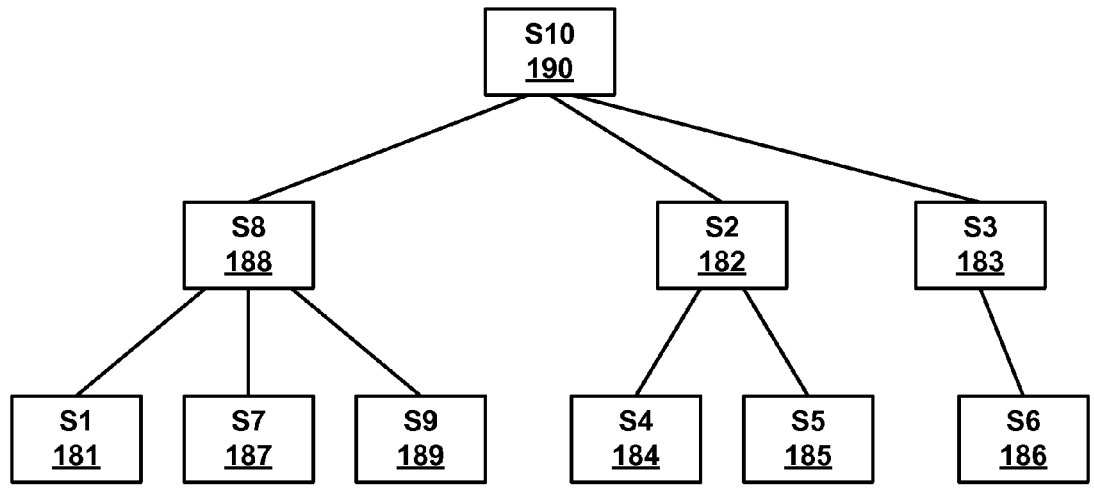
FIGS. 6A-6B are conceptual diagrams illustrating examples of unbalanced and balanced multicast trees created by a virtual network controller to provide distributed multicast service in a virtual network.
Figure 6B:
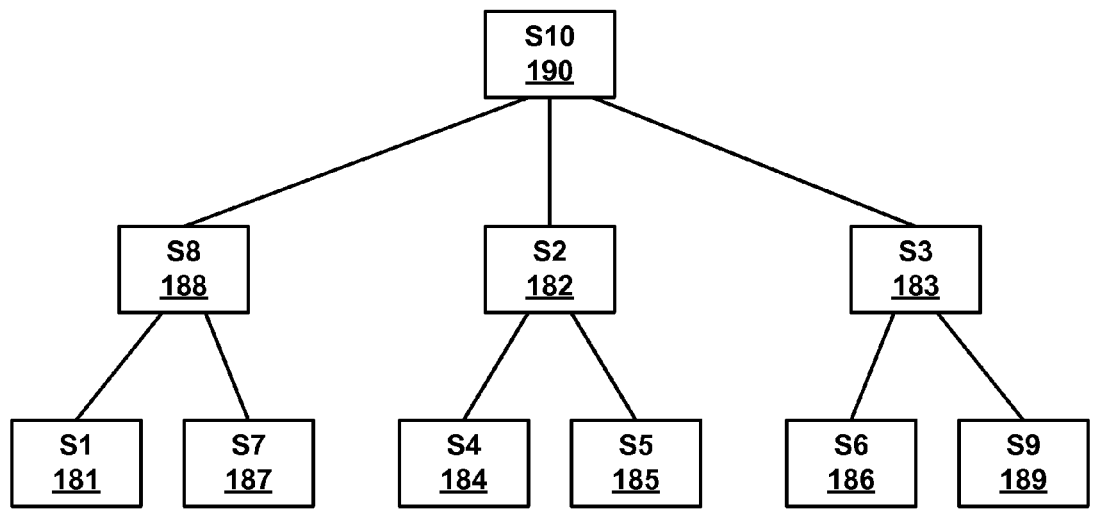

FIGS. 6A-6B are conceptual diagrams illustrating examples of unbalanced and balanced multicast trees created by a virtual network controller to provide distributed multicast service in a virtual network. In the illustrated examples, the multicast trees include ten endpoints or servers of a multicast group, S1 181, S2 182, S3 183, S4 184, S5 185, S6 186, S7 187, S8 188, S9 189 and S10 190. The multicast trees arrange the servers in stages or levels such that one or more of the servers generate copies of multicast packets to be transmitted to intermediate servers that, in turn, may make additional copies of the multicast packets to be transmitted to other servers in the multicast group.

FIG. 6A illustrates an unbalanced multicast tree that may be created by a virtual network controller, e.g., virtual network controller 22 from FIG. 2. Virtual network controller 22 may create the illustrated multicast tree in order to minimize a replication limit for each of the servers. The replication limit (N) for a given multicast tree may be selected based on a device population in the multicast group (M) such that $2 \leq N \leq (M-1)$. In some cases, the replication limit (N) for the multicast tree may be selected such that $2 \leq N << M$. In yet other cases, the replication limit (N) for the multicast tree may be determined to satisfy $[\text{LOG}_N(M)] = D$, wherein D is equal to a depth of the tree, and [X] connotes a floor function equal to the largest integer not greater than X. The replication limit specifies a maximum number of copies of a multicast packet that each server in the multicast tree must make. The tree depth specifies a number of stages or levels of servers in the topology of the multicast tree.

In some cases, virtual network controller 22 may create the multicast tree to balance the replication limit (N) and the tree depth (D). Minimizing the replication limit for all the servers in the multicast tree avoids having an overly horizontal tree topology in which one or two servers in the tree incur the load of replicating and forwarding packets to a majority of the servers. The replication limit may be balanced against the tree depth to avoid having an overly vertical tree topology in which each server is making only a few, e.g., one, copies of the multicast packet for further transmission. In this way, computing resources and network resources may be conserved, and the computing load may be distributed across all the servers of the multicast group.

In the example illustrated in FIG. 6A, the number of servers in the multicast group of the multicast tree is equal to 10 (M=10) and the multicast tree has two stages or levels of servers (D=2). Virtual network controller 22, therefore, may create the multicast tree illustrated in FIG. 6A based on a replication limit equal to 3 (N=3), which satisfies $2 \leq N \leq 9$, $2 \leq N << 10$, and $[\text{LOG}_N(10)] = 2$. As shown in FIG. 6A, assuming the root server S10 is the source server, S10 190 makes three packet copies and transmits the copies to S8 188, S2 182 and S3 183. S8 188 then makes three packet copies and transmits the copies to S1 181, S7 187 and S9 189. S2 182 makes two packet copies and transmits the copies to S4 184 and S5 185. S3 183 makes only one packet copy and transmits the copy to S6 186. As can be seen, although each of the servers in the multicast tree is within the replication limit of 3, the replication load is unevenly distributed with S10 190 and S8 188 each generating 3 copies (N=3), S2 182 generating 2 copies (2<N), and the S3 183 generating 1 copy (1<N).

When total number of nodes is not $(N^{(D+1)}-1)/(N-1)$ then some of the penultimate leaf nodes may not have N leafs. This is true of the multicast tree illustrated in FIG. 6A, in which the total number of nodes is not equal to 13 so not all of S8 188, S2 182 and S3 183 can have 3 leaf nodes. In such cases, virtual network controller 22 may generate a balanced multicast tree, as illustrated in FIG. 6B, such that each penultimate leaf node will have a number of leaf nodes that differ with each other by $+/-(N/2)$.

FIG. 6B illustrates a balanced multicast tree that may be created by virtual network controller 22. As shown in FIG. 6B, again assuming the root server S10 is the source server, S10 190 makes three packet copies and transmits the copies to S8 188, S2 182 and S3 183. S8 188 then makes two packet copies and transmits the copies to S1 181 and S7 187. S2 182 makes two packet copies and transmits the copies to S4 184 and S5 185. S3 183 also makes two packet copies and transmits the copies to S6 186 and S9 189. As can be seen, each of the servers in the multicast tree is within the replication limit of 3, and the replication load is evenly distributed with S10 190 generating 3 copies (N=3) and each of S8 188, S2 182 and S3 183 generating 2 copies (2<N).

Figure 7A:
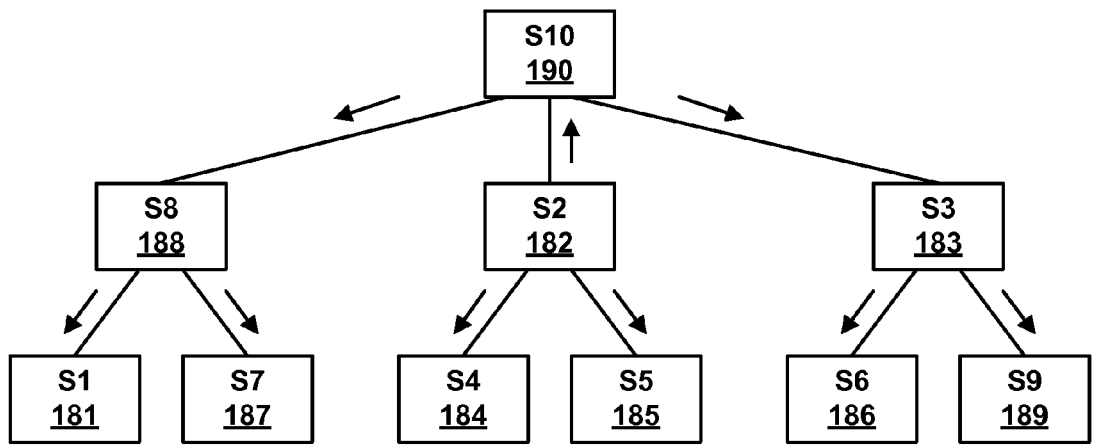
FIGS. 7A-7C are conceptual diagrams illustrating examples of multicast trees created by a virtual network controller for network endpoints in a multicast group in which any of the endpoints operates as a source node for the tree.
Figure 7B:
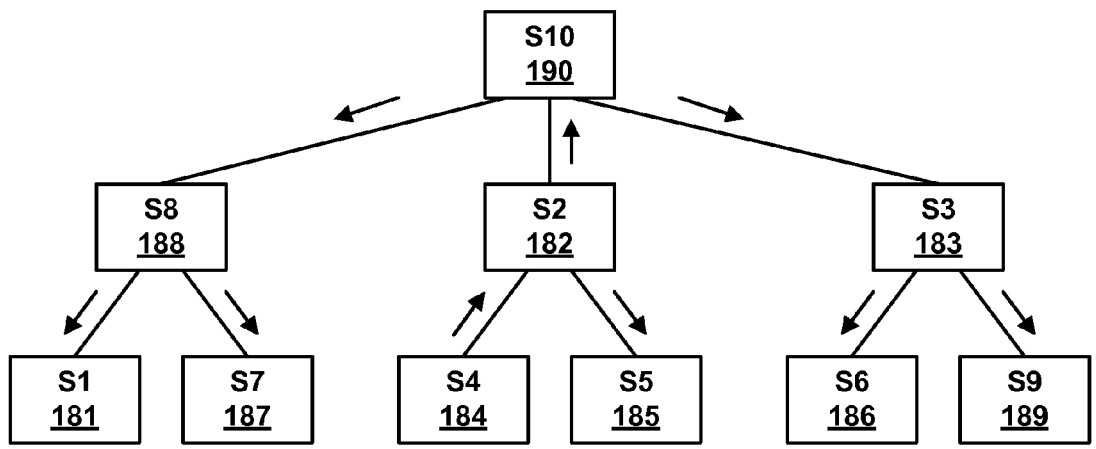
Figure 7C:
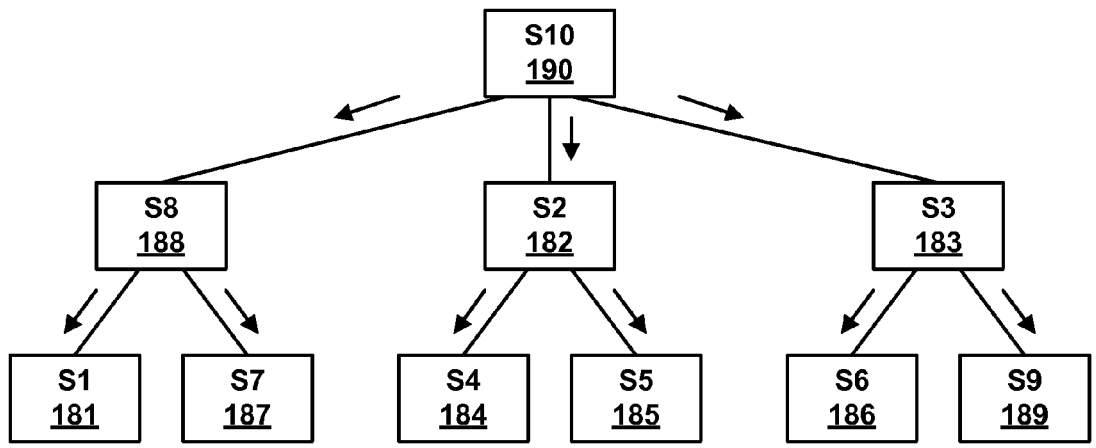

FIGS. 7A-7C are conceptual diagrams illustrating examples of multicast trees created by a virtual network controller for all servers in a multicast group in which any server operates as a source node for the tree. In the illustrated examples, the multicast trees include the same ten servers and the same balanced topology as the multicast tree illustrated in FIG. 6B. In accordance with the techniques of this disclosure, the multicast trees are created in a virtual overlay network capable of emulating L2 multicast. The multicast trees, therefore, may be bidirectional multicast trees in which any of the servers may operate as the source server of the multicast packets for the multicast group. When any of the intermediate servers receives a packet from another server in the tree, the intermediate server performs replication and transmits a packet copy on each link of the multicast tree, except the link on which the packet was received.

FIG. 7A illustrates a bidirectional multicast tree in which server S2 182 operates as the source server. As shown in FIG. 7A, S2 makes three packet copies and transmits the copies to S4 184, S5 185, and S10 190 (i.e., the root server). S10 190 then makes two packet copies and transmits the copies to S8 188 and S3 183. S10 190 does not send a packet copy on the link from which it received the packet from S2 182. S8 188 then makes two packet copies and transmits the copies to S1 181 and S7 187, but S8 188 does not send a packet copy on the link from which it received the packet from S10 190. S3 183 also makes two packet copies and transmits the copies to S6 186 and S9 189, but does not send a packet copy on the link from which it received the packet from S10 190.

FIG. 7B illustrates a bidirectional multicast tree in which server S4 184 operates as the source server. As shown in FIG. 7B, S4 makes one packet copy and transmits the copy to S2 182. S2 182 then makes two packet copies and transmits the copies to S5 185 and S10 190 (i.e., the root server). S2 182 does not send a packet copy on the link from with it received the packet from S4 184. S10 190 then makes two packet copies and transmits the copies to S8 188 and S3 183. S10 190 does not send a packet copy on the link from with it received the packet from S2 182. S8 188 then makes two packet copies and transmits the copies to S1 181 and S7 187, but S8 188 does not send a packet copy on the link from which it received the packet from S10 190. S3 183 also makes two packet copies and transmits the copies to S6 186 and S9 189, but does not send a packet copy on the link from which it received the packet from S10 190.

FIG. 7C illustrates a multicast tree in which server S10 190 (i.e., the root server) operates as the source server. In this example, the illustrated multicast tree may be a unidirectional multicast tree or a bidirectional multicast tree. As shown in FIG. 7C, S10 makes three packet copies and transmits the copies to S8 188, S2 182, and S3 183. S8 188 then makes two packet copies and transmits the copies to S1 181 and S7 187, but S8 188 does not send a packet copy on the link from which it received the packet from S10 190. S2 182 makes two packet copies and transmits the copies to S4 184 and S5 185, but S2 182 does not send a packet copy on the link from which it received the packet from S10 190. S3 183 also makes two packet copies and transmits the copies to S6 186 and S9 189, but does not send a packet copy on the link from which it received the packet from S10 190.

Figure 8:
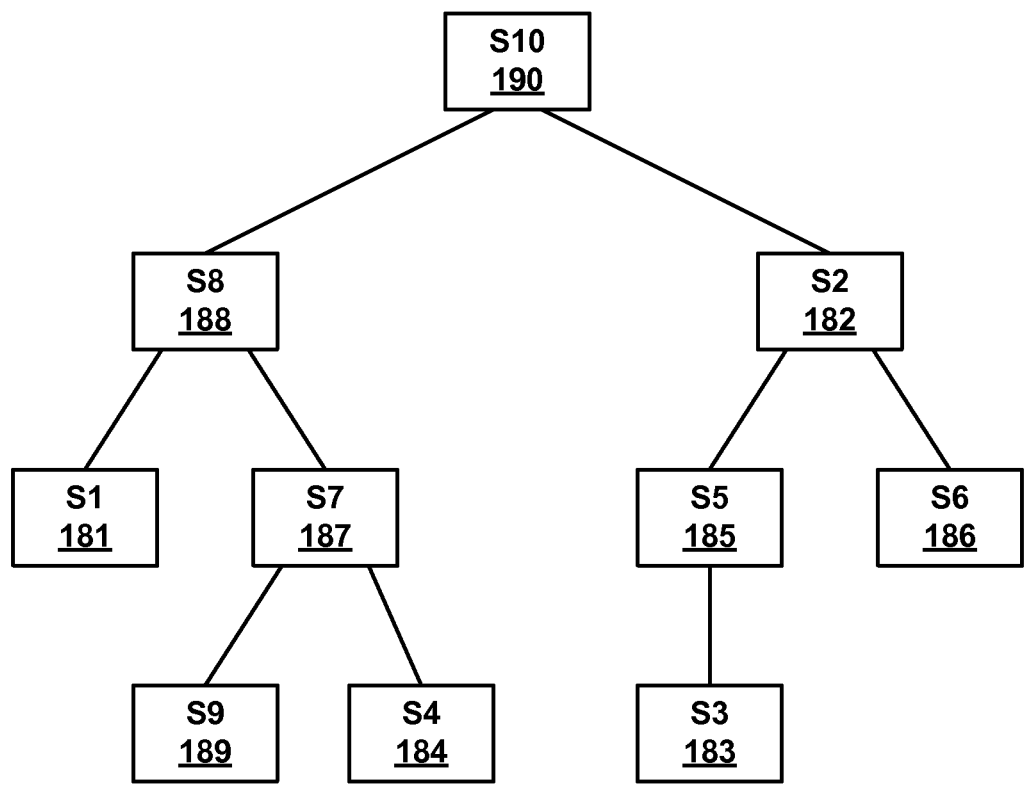
FIG. 8 is a conceptual diagram illustrating an example multicast tree created by a virtual network controller for all servers in a multicast group with a minimized replication limit.

FIG. 8 is a conceptual diagram illustrating an example multicast tree created by a virtual network controller for all servers in a multicast group with a minimized replication limit. In the illustrated example, the multicast tree includes the same ten servers as the multicast trees illustrated in FIGS. 6A-6B and FIGS. 7A-7C in a different topology. The multicast trees arrange the servers in stages or levels such that one or more of the servers generate copies of multicast packets to be transmitted to intermediate servers that, in turn, may make additional copies of the multicast packets to be transmitted to other servers in the multicast group.

The multicast tree illustrated in FIG. 8 may be created by a virtual network controller, e.g., virtual network controller 22 from FIG. 2. Virtual network controller 22 may create the illustrated multicast tree in order to further minimize a replication limit for each of the servers. In the example multicast trees in FIGS. 6A-6B and FIGS. 7A-7C, the replication limit (N) was set equal to 3 based on the number of servers in the multicast group of the multicast tree being equal to 10 (M=10) and the multicast trees having two stages or levels of servers (D=2). In the example multicast tree illustrated in FIG. 8, the number of servers in the multicast group of the multicast tree is again equal to 10 (M=10) except the tree topology has changed to include three stages or levels of servers (D=3). Virtual network controller 22, therefore, may create the multicast tree illustrated in FIG. 8 based on a replication limit equal to 2 (N=2), which satisfies $2 \leq N \leq 9$, $2 \leq N << 10$, and $\lceil LOG_N(10) \rceil = 3$.

As shown in FIG. 8, assuming the root server S10 is the source server, S10 190 makes two packet copies and transmits the copies to S8 188 and S2 182. S8 188 then makes two packet copies and transmits the copies to S1 181 and S7 187. S7 187 also makes two packet copies and transmits the copies to S9 189 and S4 184. S2 182 makes two packet copies and transmits the copies to S5 185 and S6 186. S5 185 then makes one packet copy and transmits the copy to S3 183. As can be seen, each of the servers in the multicast tree is within the replication limit of 2, and the replication load is evenly distributed with each of S10 190, S8 188, S7 187, and S2 182 generating 2 copies (N=2), and the S5 185 generating 1 copy (1<N).

Figure 9:
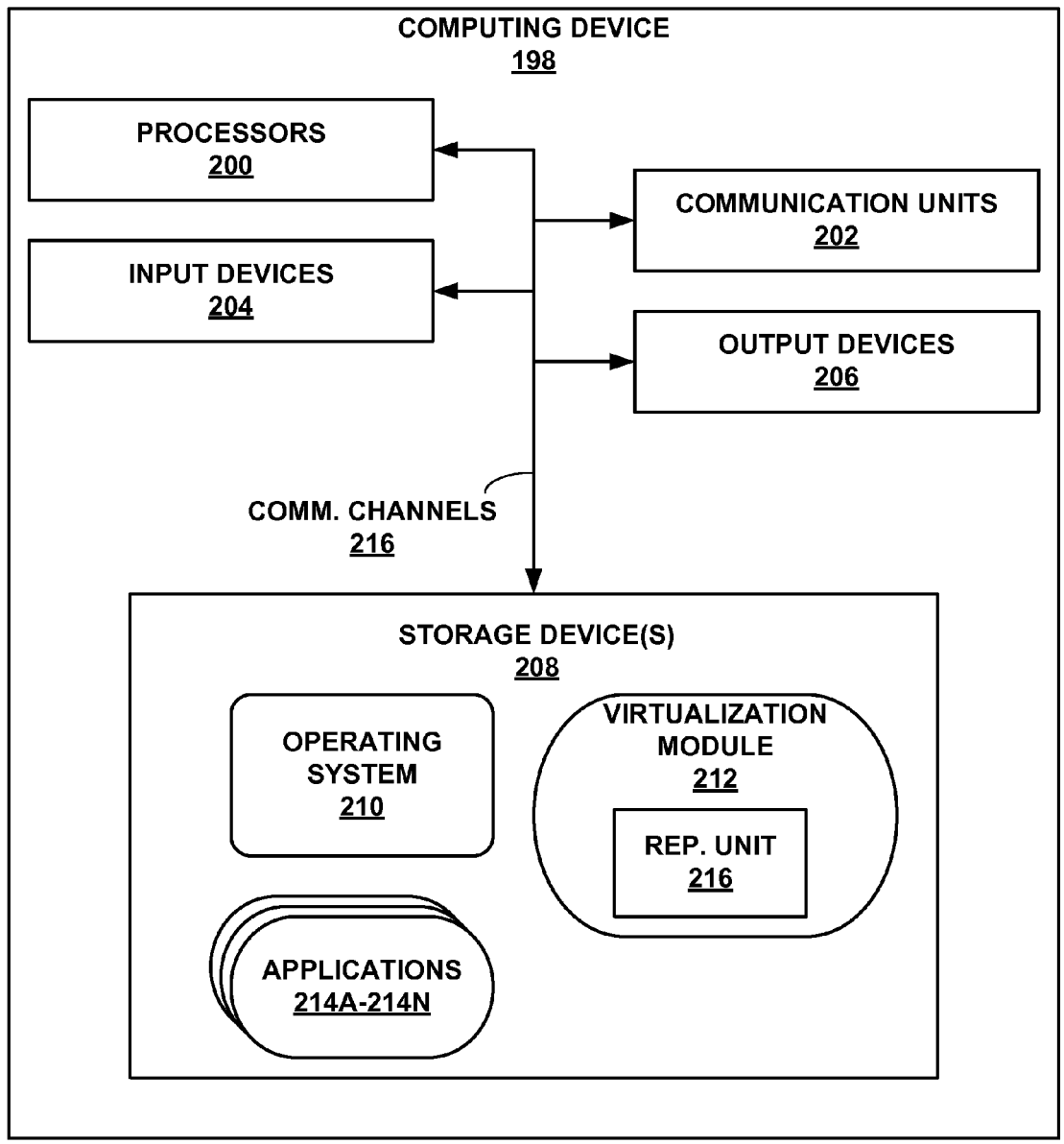
FIG. 9 is a block diagram illustrating an example computing device for replicating and forwarding packets according to a multicast tree created by a virtual network controller, in accordance with one or more aspects of the present disclosure.

FIG. 9 is a block diagram illustrating an example computing device 198 for replicating and forwarding packets according to a multicast tree created by a virtual network controller, in accordance with one or more aspects of the present disclosure. FIG. 9 illustrates only one particular example of computing device 198, and many other examples of computing device 198 may be used in other instances.

As shown in the specific example of FIG. 9, computing device 198 includes one or more processors 200, one or more communication units 202, one or more input devices 204, one or more output devices 206, and one or more storage devices 208. Computing device 198, in the specific example of FIG. 9, further includes operating system 210, virtualization module 212, and one or more applications 214A-214N (collectively "applications 214"). Each of components 200, 202, 204, 206, and 208 may be interconnected (physically, communicatively, and/or operatively) for inter-component communications. As one example in FIG. 9, components 200, 202, 204, 206, and 208 may be coupled by one or more communication channels 216. In some examples, communication channels 216 may include a system bus, network connection, interprocess communication data structure, or any other channel for communicating data. Virtualization module 212 and applications 214, as well as operating system 210 may also communicate information with one another as well as with other components in computing device 198.

Processors 200, in one example, are configured to implement functionality and/or process instructions for execution within computing device 198. For example, processors 200 may be capable of processing instructions stored in storage devices 208. Examples of processors 200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 198 during operation. Storage devices 208, in some examples, are described as a computer-readable storage medium. In some examples, storage devices 208 are a temporary memory, meaning that a primary purpose of storage devices 208 is not long-term storage. Storage devices 208, in some examples, are described as a volatile memory, meaning that storage devices 208 do not maintain stored contents when the computer is turned off. Examples of volatile memories include random access memories (RAM), dynamic random access memories (DRAM), static random access memories (SRAM), and other forms of volatile memories known in the art. In some examples, storage devices 208 are used to store program instructions for execution by processors 200. Storage devices 208, in one example, are used by software or applications running on computing device 198 (e.g., operating system 210, virtualization module 212 and the like) to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 198, in some examples, also includes one or more communication units 202. Computing device 198, in one example, utilizes communication units 202 to communicate with external devices. Communication units 202 may communicate, in some examples, by sending data packets over one or more networks, such as one or more wireless networks, via inbound and outbound links. Communication units 202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components.

Computing device 198, in one example, also includes one or more input devices 204. Input devices 204, in some examples, are configured to receive input from a user through tactile, audio, or video feedback. Examples of input devices 204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 206 may also be included in computing device 198. Output devices 206, in some examples, are configured to provide output to a user using tactile, audio, or video stimuli. Output devices 206, in one example, include a presence-sensitive display, a sound card, a video graphics adapter card, or any other type of device for converting a signal into an appropriate form understandable to humans or machines. Additional examples of output devices 206 include a speaker, a cathode ray tube (CRT) monitor, a liquid crystal display (LCD), or any other type of device that can generate intelligible output to a user.

Computing device 198 may include operating system 210. Operating system 210, in some examples, controls the operation of components of computing device 198. For example, operating system 210, in one example, facilitates the communication of applications 214 with processors 200, communication units 202, input devices 204, output devices 206, and storage devices 210. Applications 214 may each include program instructions and/or data that are executable by computing device 198. As one example, application 214A may include instructions that cause computing device 198 to perform one or more of the operations and actions described in the present disclosure.

In accordance with techniques of the present disclosure, computing device 198 may operate as an endpoint device of a virtual network, such as one of servers 12 in data center 10 from FIGS. 1 and 2. More specifically, computing device 198 may use virtualization module 212 to execute one or more virtual switches (not shown) that create and manage one or more virtual networks as virtual overlay networks of a data center switch fabric. Communication units 202 of computer device 198 may receive communications from a virtual network controller for the virtual networks.

According to the techniques, communication units 202 may receive a multicast tree for a multicast group of a virtual network from the virtual network controller, and communicate the multicast tree to a replication unit ("rep. unit") 216 executed on virtualization module 212. Communication units 202 may then receive multicast packets for the multicast group to be forwarded on the virtual network. The multicast tree may instruct replication unit 216 to replicate and forward the multicast packets to other endpoint devices according to the multicast tree. The multicast tree is calculated for the virtual network by the virtual network controller in a centralized location instead of in a distributed fashion by components in an underlying physical network. In addition, the replication and forwarding of multicast packets is only performed by virtual switches executed on computing device 198 and the other endpoint devices of the virtual network. No replication is performed within the underlying physical network. In this way, the techniques enable multicast service between computing device 198 and the other endpoint devices within the virtual network without requiring multicast support in the underlying network.

Figure 10:
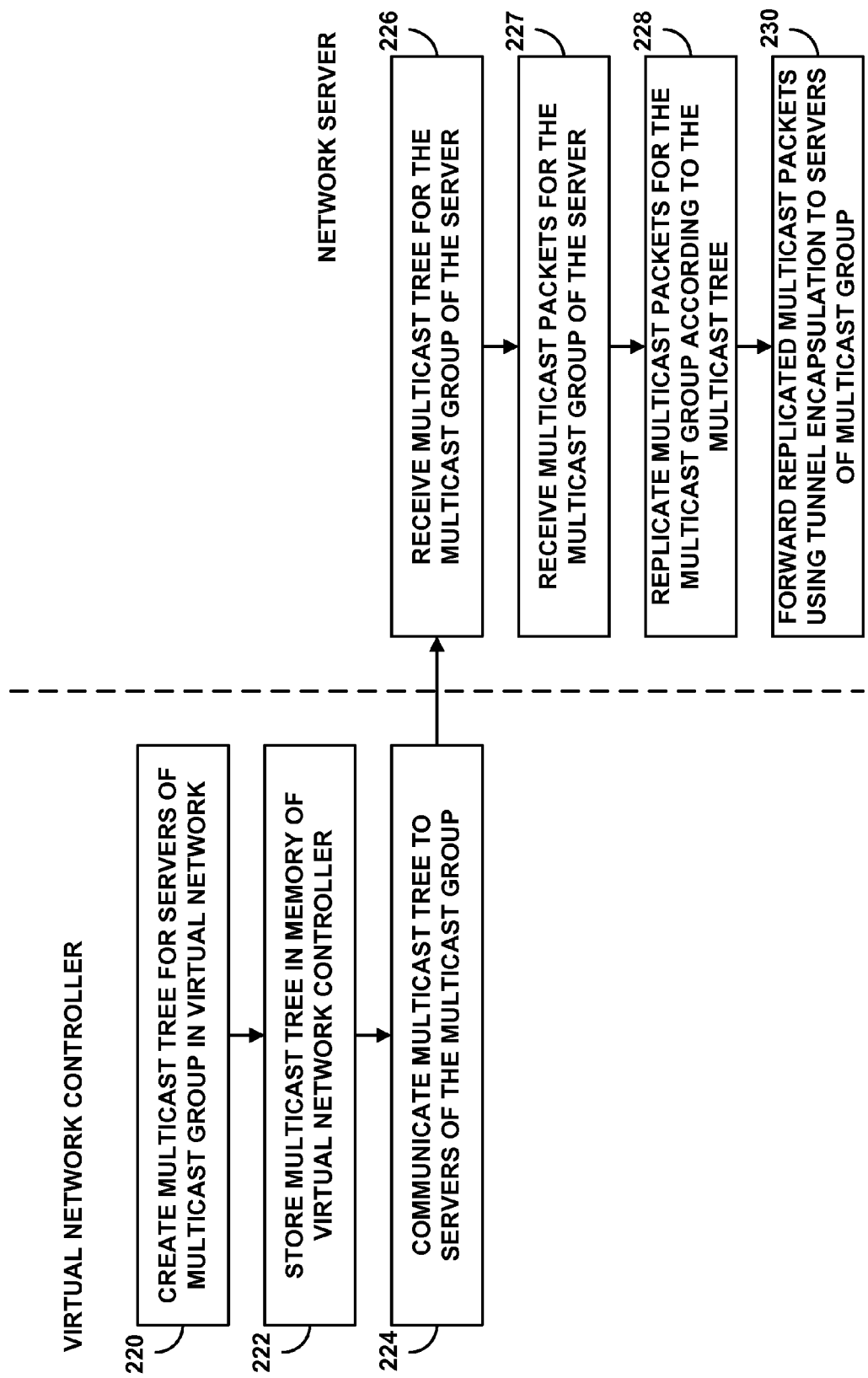
FIG. 10 is a flowchart illustrating an example operation of creating a multicast tree with a virtual network controller for network endpoints of a multicast group in a virtual network, and replicating and forwarding packets with one of the endpoints in accordance with the multicast tree to provide distributed multicast service in the virtual network.

FIG. 10 is a flowchart illustrating an example operation of creating a multicast tree with a virtual network controller for network endpoints of a multicast group in a virtual network, and replicating and forwarding packets with one of the endpoints in accordance with the multicast tree to provide distributed multicast service in the virtual network. The operation of FIG. 10 is described with respect to virtual network controller 22 and server 12A from FIG. 2.

Virtual network controller 22 uses tree unit 40 to create a multicast tree for servers 12 of a multicast group in a virtual network (220). In this way, the multicast tree is created in a logically centralized location, i.e., virtual network controller 22, instead of in a distributed fashion by components in the underlying network that service the multicast group. Tree unit 40 may create the multicast tree to facilitate delivery of multicast packets for the multicast group between two or more endpoints or servers in the virtual network.

In some cases, the multicast tree may be a unidirectional multicast tree in which a root node of the multicast tree operates as the source of the multicast packets for the multicast group and the multicast packets are communicated in a single, downstream direction from the root node. In other cases, the multicast tree may be a bidirectional multicast tree in which any node of the multicast tree may operate as the source of the multicast packets for the multicast group and the multicast packets may be communicated in either an upstream or downstream direction from a root node of the multicast tree. According to the techniques, tree unit 40 may create bidirectional multicast trees because the virtual overlay network emulates L2 multicast, which supports bidirectional multicast.

Tree unit 40 may calculate the multicast tree based on topology information of the underlying physical network received, e.g, in accordance with a routing protocol executed by VNC 22. In addition, tree unit 40 may calculate the multicast tree in order to minimize a replication limit at each of the servers and balance the replication across the tree. In this way, tree unit 40 may create the multicast tree such that each of the source and intermediate servers performs a similar, small amount of replication, instead of the source server having to incur the load of replicating and forwarding the packets to all the servers that belong to the multicast group. Virtual network controller 22 stores the multicast tree in memory 42 (222). Virtual network controller 22 then communicates the multicast tree to one or more of the servers 12 of the multicast group (224).

Server 12A, for example, receives the multicast tree for the multicast group to which server 12A belongs from virtual network controller 22 (226). Server 12A also receives multicast packets for the multicast group to be forwarded on the virtual network according to the multicast tree (227). Server 12A executes virtual switch 30A for the virtual network within hypervisor 31. Server 12A uses replication unit 44A of virtual switch 30A to replicate the multicast packets for the multicast group according to the multicast tree (228). For example, if server 12A is the source server or an intermediate server in the multicast tree, then replication unit 44A may create one or more copies of the packet as required by the multicast tree.

Server 12A then uses virtual switch 30A to forward the replicated multicast packets using tunnel encapsulation to the other servers of the multicast group in the virtual network according to the multicast tree (230). Virtual switch 30A may encapsulate each of the copies of the packet in a unique tunnel encapsulation header. In this way, multiple equal cost paths in the underlying network may be used for the same multicast group to efficiently use bandwidth. The unique tunnel encapsulation headers may be configured by virtual network controller 22 such that each link direction in the multicast tree has a unique virtual network tunnel encapsulation. The replication and forwarding of multicast packets is only performed by virtual switches 30 executed on servers 12 in the virtual network. No replication is performed within the underlying network. In this way, the techniques enable multicast service within a virtual network without requiring multicast support in the underlying network.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    creating, with a virtual network controller of a virtual network, a multicast tree for endpoint servers of a multicast group in the virtual network, wherein the virtual network includes respective virtual switches executing on the endpoint servers to provide an emulated layer 2 network for virtual machines executing on the endpoint servers;
    storing the multicast tree in a memory within the virtual network controller; and
    communicating, with the virtual network controller, the multicast tree to one or more of the endpoint servers of the multicast group in order to instruct the virtual switches executing on the endpoint servers to replicate and forward layer 2 multicast packets according to the multicast tree, the layer 2 multicast packets destined for one or more of the virtual machines executing on the endpoint servers.

2. The method of claim 1, wherein communicating the multicast tree to a particular one of the endpoint servers comprises communicating one or more forwarding entries of the multicast tree relevant to the particular one of the endpoint servers.

3. The method of claim 2, wherein the one or more forwarding entries include next hop information of the multicast tree, and wherein the next hop information includes a chained next hop that specifies replication to be performed on each of the layer 2 multicast packets for the multicast group by the particular one of the endpoint servers.

4. The method of claim 1, wherein creating the multicast tree comprises configuring a unique virtual network tunnel encapsulation for each link direction in the multicast tree.

5. The method of claim 1, wherein creating the multicast tree comprises creating the multicast tree based on one or more of membership information for the multicast group, network topology information of a physical network underlying the virtual network, and network topology information of the virtual network.

6. The method of claim 1, wherein creating the multicast tree comprises creating the multicast tree to minimize a replication limit for each of the endpoint servers in the multicast group.

7. The method of claim 1, wherein creating the multicast tree comprises creating the multicast tree to balance a replication limit for each of the endpoint servers in the multicast group with a tree depth of the multicast tree.

8. The method of claim 1, wherein the virtual network controller of the virtual network comprises a centralized controller of a virtual overlay network of a data center switch fabric.

9. The method of claim 1, wherein the multicast tree comprises one of a unidirectional multicast tree or a bidirectional multicast tree.

10. A method comprising:
    receiving, with an endpoint server of a multicast group in a virtual network, layer 2 multicast packets to be forwarded on the virtual network according to a multicast tree for the multicast group, the multicast tree created by a virtual network controller of the virtual network, wherein the virtual network includes a virtual switch executing on the endpoint server to provide an emulated L2 network for one or more virtual machines executing on the endpoint server;

replicating, with the virtual switch executed on the endpoint server, the layer 2 multicast packets for the multicast group according to the multicast tree; and forwarding, with the virtual switch executed on the endpoint server, the replicated layer 2 multicast packets using tunnel encapsulations to one or more other endpoint servers of the multicast group according to the multicast tree.

11. The method of claim 10, further comprising receiving, with the endpoint server from the virtual network controller, one or more forwarding entries of the multicast tree relevant to the endpoint server.

12. The method of claim 11, wherein the one or more forwarding entries include next hop information of the multicast tree, and wherein the next hop information includes a chained next hop that specifies replication to be performed on each of the multicast packets for the multicast group by the endpoint server.

13. The method of claim 10, wherein forwarding the layer 2 multicast packets comprises encapsulating each copy of the layer 2 multicast packets with a unique virtual network tunnel encapsulation configured by the virtual network controller.

14. The method of claim 10, wherein replicating the layer 2 multicast packets comprises replicating the layer 2 multicast packets based on a minimized replication limit for the endpoint server.

15. The method of claim 10, wherein the endpoint server comprises a source node of the multicast tree that replicates and forwards layer 2 multicast packets to one or more other endpoint servers of the multicast group according to the multicast tree.

16. The method of claim 10, wherein the endpoint server comprises an intermediate node that receives layer 2 multicast packets from another endpoint server of the multicast group, and replicates and forwards the layer 2 multicast packets to one or more other endpoint servers of the multicast group according to the multicast tree without sending the layer 2 multicast packets on a link to the endpoint server from which the multicast packets were received.

17. The method of claim 10, wherein the endpoint server in the virtual network comprises a server in a virtual overlay network of a data center switch fabric.

18. The method of claim 10, wherein the multicast tree comprises one of a unidirectional multicast tree or a bidirectional multicast tree.

19. A virtual network controller of a virtual network comprising:
a memory; and
one or more processors coupled to the memory and configured to:
create a multicast tree for endpoint servers of a multicast group in the virtual network, wherein the virtual network includes respective virtual switches configured to execute on the endpoint servers to provide an emulated layer 2 network for virtual machines configured to execute on the endpoint servers,
store the multicast tree in the memory of the virtual network controller, and
communicate the multicast tree to one or more of the endpoint servers of the multicast group in order to instruct the virtual switches executing on the endpoint servers to replicate and forward layer 2 multicast packets according to the multicast tree, the layer 2 multicast packets destined for one or more of the virtual machines configured to execute on the endpoint servers.

20. The virtual network controller of claim 19, wherein the processors are configured to communicate the multicast tree to a particular one of the endpoint servers as one or more forwarding entries of the multicast tree relevant to the particular one of the endpoint servers.

21. The virtual network controller of claim 20, wherein the one or more forwarding entries include next hop information of the multicast tree, and wherein the next hop information includes a chained next hop that specifies replication to be performed on each of the layer 2 multicast packets for the multicast group by the particular one of the endpoint servers.

22. The virtual network controller of claim 19, wherein the processors are configured to configure a unique virtual network tunnel encapsulation for each link direction in the multicast tree.

23. The virtual network controller of claim 19, wherein the processors are configured to create the multicast tree based on one or more of membership information for the multicast group, network topology information of a physical network underlying the virtual network, and network topology information of the virtual network.

24. The virtual network controller of claim 19, wherein the processors are configured to create the multicast tree to minimize a replication limit for each of the endpoint servers in the multicast group.

25. The virtual network controller of claim 19, wherein the processor are configured to create the multicast tree to balance a replication limit for each of the endpoint servers in the multicast group with a tree depth of the multicast tree.

26. The virtual network controller of claim 19, wherein the virtual network controller of the virtual network comprises a centralized controller of a virtual overlay network of a data center switch fabric.

27. An endpoint server in a virtual network, the endpoint server comprising:
one or more processors configured to receive layer 2 multicast packets for a multicast group to which the endpoint server belongs to be forwarded on the virtual network according to a multicast tree for the multicast group, wherein the multicast tree is created by a virtual network controller of the virtual network; and
a virtual switch executed on the processors configured to:
provide, as part of the virtual network, an emulated L2 network for one or more virtual machines configured to execute on the endpoint server, and
replicate the multicast packets for the multicast group according to the multicast tree, and forward the replicated layer 2 multicast packets using tunnel encapsulations to one or more other endpoint servers of the multicast group according to the multicast tree.

28. The endpoint server of claim 27, wherein the processors are configured to receive, from the virtual network controller, one or more forwarding entries of the multicast tree relevant to the endpoint server.

29. The endpoint server of claim 28, wherein the one or more forwarding entries include next hop information of the multicast tree, and wherein the next hop information includes a chained next hop that specifies replication to be performed on each of the multicast packets for the multicast group by the endpoint server.

30. The endpoint server of claim 27, wherein the virtual switch is configured to encapsulate each copy of the layer 2 multicast packets with a unique virtual network tunnel encapsulation configured by the virtual network controller.

31. The endpoint server of claim 27, wherein the virtual switch is configured to replicate the layer 2 multicast packets based on a minimized replication limit for the endpoint device.

32. The endpoint server of claim 27, wherein the endpoint server comprises a source node of the multicast tree that replicates and forwards multicast packets to two or more other endpoint servers of the multicast group according to the multicast tree.

33. The endpoint server of claim 27, wherein the endpoint server comprises an intermediate node that receives layer 2 multicast packets from another endpoint device of the multicast group, and replicates and forwards the layer 2 multicast packets to one or more other endpoint servers of the multicast group according to the multicast tree without sending the layer 2 multicast packets on a link to the endpoint server from which the layer 2 multicast packets were received.

34. The endpoint server of claim 27, wherein the endpoint server in the virtual network comprises a server in a virtual overlay network of a data center switch fabric.

35. A system of a virtual network, the system comprising:
a virtual network controller configured to create a multicast tree for endpoint servers of a multicast group in the virtual network, store the multicast tree in a memory within the virtual network controller, and communicate the multicast tree to one or more of the endpoint servers of the multicast group, wherein the virtual network includes respective virtual switches executing on the endpoint servers to provide an emulated layer 2 network for virtual machines executing on the endpoint servers; and
one of the endpoint servers of the multicast group configured to receive layer 2 multicast packets for the multicast group to be forwarded on the virtual network, and execute a virtual switch to replicate the layer 2 multicast packets for the multicast group according to the multicast tree, and forward the replicated layer 2 multicast packets using tunnel encapsulations to one or more of the other endpoint servers of the multicast group according to the multicast tree.

36. A non-transitory computer-readable storage medium comprising instructions that when executed cause one or more processors to:
create, with a virtual network controller of a virtual network, a multicast tree for endpoint servers of a multicast group in the virtual network, wherein the virtual network includes respective virtual switches executing on the endpoint servers to provide an emulated layer 2 network for virtual machines executing on the endpoint servers;
store the multicast tree in a memory within the virtual network controller; and
communicate, with the virtual network controller, the multicast tree to one or more of the endpoint servers of the multicast group in order to instruct the virtual switches executing on the endpoint servers to replicate and forward layer 2 multicast packets according to the multicast tree, the layer 2 multicast packets destined for one or more of the virtual machines executing on the endpoint servers.

37. A non-transitory computer-readable storage medium comprising instructions that when executed cause one or more processors to:
receive, with an endpoint server of a multicast group in a virtual network, layer 2 multicast packets to be forwarded on the virtual network according to a multicast tree for the multicast group, the multicast tree created by a virtual network controller of the virtual network, wherein a virtual switch executing on the endpoint server to provides an emulated L2 network for one or more virtual machines executing on the endpoint server;
replicate, with the virtual switch executed on the endpoint server, the layer 2 multicast packets for the multicast group according to the multicast tree; and
forward, with the virtual switch executed on the endpoint server, the replicated layer 2 multicast packets using tunnel encapsulations to one or more other endpoint servers of the multicast group according to the multicast tree.

* * * * *